(12) United States Patent
Klatt et al.

(10) Patent No.: US 10,597,175 B2
(45) Date of Patent: *Mar. 24, 2020

(54) METHOD AND DEVICE FOR PRODUCING A CONTAINER FILLED WITH A LIQUID FILLING MATERIAL

(71) Applicants: KHS GmbH, Dortmund (DE); KHS Corpoplast GmbH, Hamburg (DE)

(72) Inventors: Dieter Klatt, Hamburg (DE); Frank Haesendonckx, Hamburg (DE); Ludwig Clüsserath, Bad Kreuznach (DE); Manfred Härtel, Weilerbach (DE); Wilfried Ehmer, Dortmund (DE)

(73) Assignees: KHS GMBH, Dortmund (DE); KHS CORPOPLAST GMBH, Hamburg (DE)

( * ) Notice: Subject to any disclaimer, the term of this patent is extended or adjusted under 35 U.S.C. 154(b) by 789 days.

This patent is subject to a terminal disclaimer.

(21) Appl. No.: 14/418,559

(22) PCT Filed: Jul. 31, 2013

(86) PCT No.: PCT/EP2013/002268

§ 371 (c)(1),
(2) Date: Apr. 2, 2015

(87) PCT Pub. No.: WO2014/019691

PCT Pub. Date: Feb. 6, 2014

(65) Prior Publication Data

US 2015/0298828 A1    Oct. 22, 2015

(30) Foreign Application Priority Data

Aug. 1, 2012    (DE) .................. 10 2012 015 087

(51) Int. Cl.
*B65B 3/02*    (2006.01)
*B29C 49/12*    (2006.01)
(Continued)

(52) U.S. Cl.
CPC .............. *B65B 3/022* (2013.01); *B29C 49/12* (2013.01); *B29C 49/46* (2013.01); *B29C 49/06* (2013.01);
(Continued)

(58) Field of Classification Search
CPC ......... B65B 3/022; B29C 49/12; B29C 49/46; B29C 49/06; B29C 49/36; B29C 49/4205; B29C 49/66; B29C 2049/1228; B29C 2049/4294; B29C 2049/4626; B29C 2049/4664; B29C 2049/5855; B29C 49/18; B29C 49/4268; B29L 2031/7158
See application file for complete search history.

(56) References Cited

U.S. PATENT DOCUMENTS 4,076,071 A    2/1978    Rosenkranz et al.
5,346,386 A    9/1994    Albrecht et al.
(Continued)

FOREIGN PATENT DOCUMENTS

DE    2352926 A1    4/1975
DE    4212583 A1    10/1993
(Continued)

*Primary Examiner* — Matthew J Daniels
*Assistant Examiner* — Andrew L Swanson
(74) *Attorney, Agent, or Firm* — Lucas & Mercanti, LLP; Klaus P. Stoffel

(57) ABSTRACT

A method and a device for producing a container filled with a liquid filling material from preforms made of a thermoplastic material, wherein each preform is thermally conditioned and subsequently, during a molding and filling phase, remolded into the container in a mold having at least one liquid filling material as a pressure medium. The filling material or parts of the filling material are supplied at at least two points in time and/or in at least two process phases with different contents of carbon dioxide and/or at different temperatures. In the second process phase, dry ice, particularly in form of pellets, is supplied.

19 Claims, 10 Drawing Sheets

(51) Int. Cl.
*B29C 49/46* (2006.01)
*B29C 49/58* (2006.01)
*B29C 49/42* (2006.01)
*B29C 49/36* (2006.01)
*B29C 49/66* (2006.01)
*B29L 31/00* (2006.01)
*B29C 49/06* (2006.01)

(52) U.S. Cl.
CPC .......... *B29C 49/36* (2013.01); *B29C 49/4205* (2013.01); *B29C 49/66* (2013.01); *B29C 2049/1228* (2013.01); *B29C 2049/4294* (2013.01); *B29C 2049/4626* (2013.01); *B29C 2049/4664* (2013.01); *B29C 2049/5855* (2013.01); *B29L 2031/7158* (2013.01)

(56) References Cited

U.S. PATENT DOCUMENTS

| | | |
|---|---|---|
| 5,648,026 A | 7/1997 | Weiss |
| 6,502,369 B1 * | 1/2003 | Andison ................ B65B 3/022 53/275 |
| 2003/0104146 A1 * | 6/2003 | Kikuchi ................ B29B 11/12 428/34.7 |
| 2008/0029928 A1 * | 2/2008 | Andison ................ B29C 49/46 264/238 |
| 2009/0218733 A1 * | 9/2009 | Andison ................ B29C 49/46 264/525 |
| 2011/0135778 A1 * | 6/2011 | Andison ................ B29C 49/46 425/524 |
| 2012/0266567 A1 | 10/2012 | Haesendonckx et al. |

FOREIGN PATENT DOCUMENTS

| | | | |
|---|---|---|---|
| DE | 4340291 A1 | 6/1995 | |
| DE | 102010007541 A1 | 6/2011 | |
| DE | 102011011076 A1 | 8/2012 | |
| EP | 0375912 A1 * | 7/1990 | ............ B65B 3/04 |
| EP | 0375912 A1 | 7/1990 | |
| WO | WO-9415489 A1 * | 7/1994 | ............ A23L 2/54 |
| WO | 2007120807 A2 | 10/2007 | |
| WO | 2011076167 A1 | 6/2011 | |
| WO | WO 2011076167 A1 * | 6/2011 | ............ B29C 49/12 |
| WO | WO-2011076167 A1 * | 6/2011 | ............ B29C 49/12 |

* cited by examiner

METHOD AND DEVICE FOR PRODUCING A CONTAINER FILLED WITH A LIQUID FILLING MATERIAL

The present application is a 371 of international application PCT/EP2013/002268, filed Jul. 31, 2013, which claims priority of DE 10 2012 015 087.3, filed Aug. 1, 2012, the priority of these applications is hereby claimed and these applications are incorporated herein by reference.

BACKGROUND OF THE INVENTION

The invention concerns a method for producing containers filled with a liquid filling material from thermoplastic preforms as well as a device for producing the containers filled with the liquid.

The production of containers by blow molding from preforms made of a thermoplastic material is well-known, for instance from preforms made of PET (polyethylene terephthalate), whereas the preforms are conveyed to various machining stations inside a blow molding machine (DE-OS 43 40 291). Typically, a blow molding machine includes a heating device for tempering or preheating (thermal conditioning) of the preforms as well as a blow molding device with at least a blow molding station, in which area the preform previously tempered is expanded biaxially or multiaxially to become a container. The expansion takes place with the aid of a compressed gas (compressed air) as a pressure medium, which is introduced into the preform to be expanded with a forming pressure. The process-related sequence of such an expansion of the preform is explained in document DE-OS 43 40 291.

The basic construction of a blow molding station is described in DE-OS 42 12 583. The possible tempering methods of the preforms are explained in DE-OS 23 52 926.

According to a typical further processing treatment, the containers produced by blow molding are conveyed to a subsequent filling device and then filled with the product or filling material provided. A separate blow molding machine and a separate filling machine are thus used. It is also known to regroup the separate blow molding machine and the separate filling machine to obtain a machine block, i.e. to obtain a blocked blow molding and filling device, whereas the blow molding and the filling continue to be performed at distinct machine components and chronologically one after the other.

It has been moreover already suggested, to produce containers, in particular in the form of bottles, from thermally conditioned or preheated preforms and thereby to fill them simultaneously with a liquid filling material, which is conveyed as a hydraulic pressure medium for expanding the preform or for shaping the container with a forming and filling pressure so that the respective preform is transformed into the container at the same time as the filling process. Such methods, at which simultaneous forming and filling of the respective container takes place, can be designated as a hydraulic transformation method or hydraulic formation of containers.

During the formation of the containers from the preforms by the filling material, i.e. by using the filling material as a hydraulic pressure medium, only one machine is necessary to form and fill the containers, which in turn exhibits an increased complexity. The first experimental results with such devices indeed show that the quality of the produced containers is still significantly lower than the quality of conventionally produced blow formed containers. The cause is among other things that a multiplicity of process parameters which are available when performing the usual blow molding process, parameters which are either absent during the hydraulic formation of containers or cannot be exploited as yet.

There is a particular problematic with the hydraulic formation of containers inasmuch as any contamination should be avoided for the respective forming and filling station or of the mould constituting said station, which mould is similar to a blow mould of a blow molding machine for the production of containers from thermally conditioned preforms by blowing with a compressed gas. Especially in the case of a full or partial carbonation of the filling material, there is in a particular extent the danger of a contamination of the respective forming and filling station through losses of filling material, in particular when lowering the inside pressure of the container, i.e. when relieving the container from the quite high forming and filling pressure down to the ambient pressure. Such losses of filling material are conditioned in particular by a massive foaming during the relieving process so that the simultaneous forming and filling of containers by using preforms and by using the filling material as a pressure medium (hydraulic transformation technique), in particular for CCV-containing products could not be contemplated so far.

SUMMARY OF THE INVENTION

The object of the invention is to provide a method which avoids the danger of any contamination of the respective forming and filling station even with a CCV-containing filling material, during the hydraulic transformation method or during the hydraulic forming of containers, especially with high throughputs (number of the formed and filled containers per time unit) and/or with a high $CO_2$ content of the filing material introduced into the respective container.

In the method according to the invention, preforms made of a thermoplastic material are thermally conditioned and subsequently transformed into the container during a forming and filling phase inside of a mould with at least one liquid filling material as a pressure medium.

In this process, the filling material or portions of the filling material are supplied at least at two points in time and/or in at least two process phases with different carbon dioxide contents and/or with different temperatures, The method according to the invention is characterized in particular in that in the second process phase dry ice is conveyed in particular in the form of pellets.

Preferably, degassed filling material is conveyed in one process phase. The $CO_2$ content is then equal to zero or close to zero according to the degree of degassing.

The filling material can then be carbonized in the second process phase when the filling material with higher carbon dioxide content is conveyed. The carbonization can take place completely or partially by adding carbon dioxide in the form of dry ice. Dry ice can be conveyed in the form of pellets, for instance at the filling material surface or in the region of the container bottom. The dry ice can be inserted into the filling material or shot into the filling material.

In complement thereto, the carbonization can also partially take place at at least 1 bar, preferably between 1 and 2 bars above the respective saturation pressure, which depends on the temperature of the filing material.

To guarantee the best possible product quality, the respective preform is preferably guided, during its transformation into a container bubble in formation and then into the container having the final contour or shaping, so that a centre is defined, typically in the region of a preform summit, and can be positioned reproducibly. Such a defined positioning is important since during the transformation or expansion of the preform into the container, a biaxial orientation of the material of the preform is performed, and to do so, a targeted and predefinable material distribution inside the wall of the formed container is required. In contrast, if the formation of containers is not perfectly controlled, undesirable and particularly irregular material distributions can be expected.

Guiding during the forming and filling phase can be particularly efficient by using a stretching bar or a stretching rod, whereas the filling material is conveyed e.g. at least partially through the stretching rod. Alternatively or in complement thereto, the filling material can at least partially also be conveyed past the stretching rod.

It is possible to achieve regular and hydraulic formation of containers by conveying the filling material at least temporarily with a constant volume flow rate. Possibilities to influence the material distribution inside the wall of the container in formation or readily shaped is to convey the filling material at least temporarily with a variable volume flow rate.

A very compact construction is facilitated by forming, filling and closing the containers on a rotating process wheel or rotor.

A further embodiment consists in measuring the generated stretching force. Only low stretching forces to be exerted by the stretching rod can be achieved by controlling the volume flow rate of the filling material according to the stretching force measured.

Independent of the aforementioned features or in addition to these features, the method according to the invention is preferably further improved in such a way
that degassed filling material is conveyed during the first process phase,
and/or that during the second process phase the filling material or the portion of filling material with the higher concentration of carbon dioxide is conveyed,
and/or that the filling material or the portion or more precisely the component of the filling material with the higher concentration of $CO_2$ is cooled prior to the introduction and in the second process phase the filling material or the portion of filling material with the higher concentration of $CO_2$ has a lower temperature than the filling material or the portion of filling material of the first process phase,
and/or that the carbon dioxide content or $CO_2$ content in a second process phase is 30% in weight, preferably 50 to 100% in weight greater than the $CO_2$ content of the first phase,
and/or that the temperature of the filling material or of the portion of filling material of the second process phase is lower than 10° C., in particular ranges between 4° C. and 8° C.,
and/or that the pressure of the filling material or of the portion of filling material, which has the higher carbon dioxide concentration and/or the lower temperature, is at least temporarily during the forming process higher than at least one other portion or the rest of the filling material, and in particular is higher by at least 1 bar,
and/or that the pressure on a partial conduit distance is higher than the pressure of the filling material or of the portion of filling material which has the higher carbon dioxide concentration and/or the lower temperature, preferably at least temporarily during the forming process or during the forming and filling phase is higher by 2 bars to 5 bars than at least one other portion or the rest of the filling material,
and/or that a throttle element or a narrowing cross-section is provided in the flow path of the filling material or of the portion of the filling material flowing inside the stretching bar, whereas the throttle element is arranged in particular close to at least one outlet formed at the stretching rod,
and/or that a portion of the filling material is guided past the stretching rod and a portion of the filling material is guided through the stretching rod,
and/or that the portion of the filling material with the higher $CO_2$ content is cooled,
and/or that the portion of the filling material with the higher $CO_2$ content is conveyed through the stretching rod,
and/or that the stretching rod is thermally insulated at least in certain areas with respect to the filling material,
whereas the aforementioned features can be provided respectively individually or in any combination.

The device according to the invention is fitted with a heating line for preheating the preforms and with at least one forming and filling station having a mould, as well as with at least one supply device to provide the filling material, whereas preferably a carbonation unit is provided for introducing or dissolving carbon dioxide at least into a partial flow of the filling material. The device according to the invention is characterized in that said at least one forming and filling station is fitted with at least one device for supplying dry ice, in particular in the form of pellets.

The device of the invention may as an enhancement of the invention preferably be designed in such a way
that a cooling unit is provided along a conduit or a conduit section for the respective portion of the filling material in which (portion) downstream, i.e. after cooling and flowing through the conduit section, carbon dioxide is dissolved or which flows towards the conduit from the carbonation unit,
and/or that at least the conduit section in which the filling material or the portion of the filling material with the high $CO_2$ content is guided is insulated, in particular with an insulation consisting of Teflon or of a Teflon-containing material,
and/or that at least the conduit section in which the filling material or the portion of the filling material with the high $CO_2$-content is guided is cladded with an insulation, for instance with Teflon or a Teflon-containing material,
whereas the aforementioned features can be provided respectively individually or in any combination.

Further developments, advantages and application possibilities of the invention can also be derived from the following description of exemplary embodiments and from the figures. All the features described and/or illustrated individually or in any combination, form basically the object of the invention, independent of their combination in the claims or their back-reference. The content of the claims is made an integral part of the description.

The expressions "substantially" or "approximately" refer in the context of the invention to deviations of the respective exact values of +/−10%, preferably of +/−5% and/or deviations in the form of modifications which are negligible for the function.

BRIEF DESCRIPTION OF THE DRAWING

The invention is described more in detail below in the light of the figures illustrating exemplary embodiments. The figures are as follows.

DETAILED DESCRIPTION OF THE INVENTION

Figure 1:
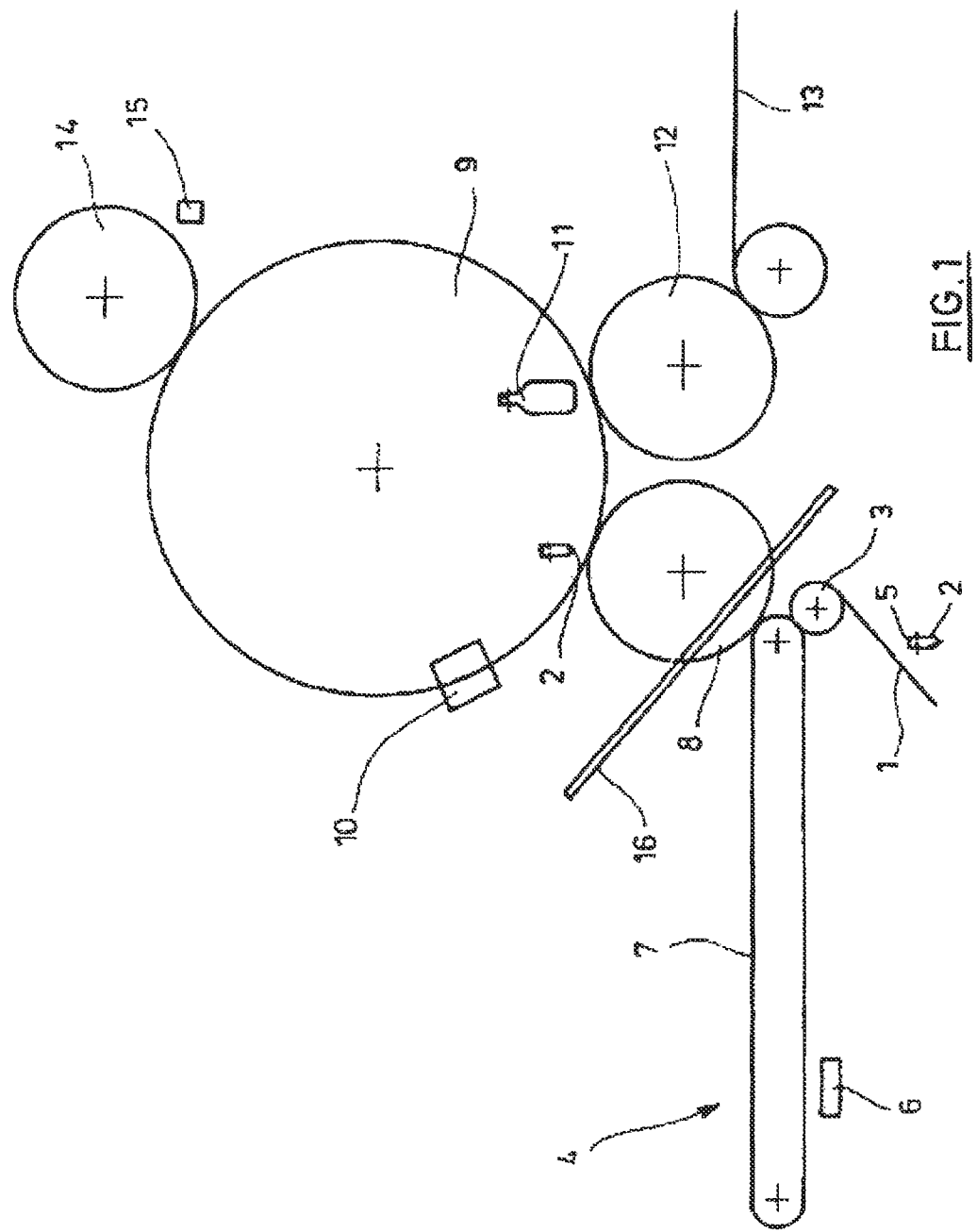
FIG. 1 is a diagrammatical illustration of a basic configuration of a device or forming and filling machine to perform the hydraulic formation of containers by using a filling material.

The general configuration of a combined forming and filling device or machine is represented in FIG. 1. Preforms 2 are conveyed from a feeding device 1, by using a transfer wheel 3, from a heating device 4. In the region of the heating device 4, in which the preforms 2 are preheated or thermally conditioned, the preforms 2 can be transported, depending on the application, for example with their mouth sections 5 upwards in vertical direction or downwards in vertical direction. The heating device 4 can for example be fitted with heating elements 6, which are arranged along a transport device 7. A rotating chain for example can be used as a transport device 7. IR or NIR radiators as well as other energy-emitting radiators are for example appropriate as heating elements 6.

After sufficient tempering (also thermal conditioning), the preforms 2 are transferred by a transfer wheel 8 to a rotor or process wheel 9, which can be driven to rotate around a vertical machine axis, or to forming and filling stations 10 arranged rotatably, i.e. on the rotor or process wheel 9. The process wheel 9 is fitted with a plurality of such forming stations 19, in the region of which the preforms 2 are transformed into the diagrammatically represented containers 11, as well as the containers 11 are filled with the filling material provided. Every container 11 is formed at the same time as it is the filled whereby the filling material serves as a pressure medium during the forming process.

After forming and filling, the containers 11 are transported away from the process wheel 9 by an extraction wheel 12 and conveyed to an output line 13.

According to the embodiment of FIG. 1, diagrammatically represented closing members 15 are supplied to the process wheel 9 via a feeding device 14. It is thus possible to close hermetically the containers 11 on the process wheel 9 and to manipulate fully formed, filled and closed containers 11 by using the extraction device 12. The closing member 15 be designed for example as a screw-on closure cap, as a crown cap or as a seal film.

Preferably, various thermoplastic materials can be used as a material for the preforms 1. By way of example, we may quote polyethylene terephthalate (PET), polyethylene (PE), polyethylene naphthalate (PEN) or polypropylene (PP). The dimensioning as well as the weight of the preforms 2 can be adapted to the size, the weight and/or the design of the containers 11 to be manufactured.

A plurality of electrical and electronic components is arranged typically in the region of the heating device 4. Moreover, the heating elements 6 are fitted with moisture-sensitive reflectors. As the containers are filled and formed in the region of the process wheel 9 by using the liquid filling material, it must be ensured that any unintentional ingress of moisture into the region of the heating device 4 is prevented. This can for instance be in the form of a partitioning 16 which at least provides a splashguard. Moreover, it is also possible to temper the transport elements for the preforms as appropriate in the region of the transfer wheel 8 or to act upon them with thrusts of compressed gas in such a way that any adhering moisture cannot reach into the region of the heating device 4.

The preforms 2 and/or the containers 11 can be manipulated preferably using claws and/or clamping or plug-in elements acting upon the mouth section 5 at least in certain areas from the inside or from the outside.

Figure 2:
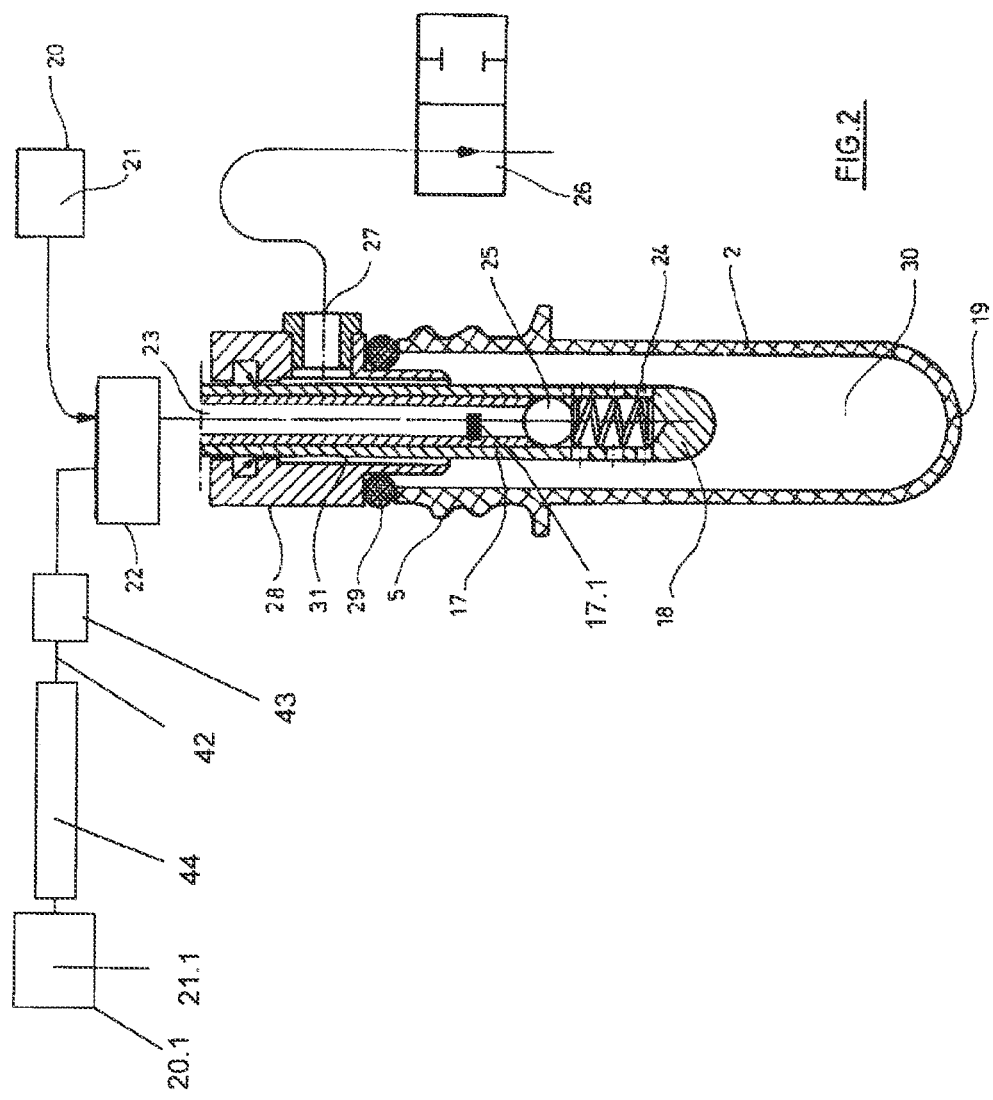
FIG. 2 a diagrammatical longitudinal section through a preform with a partially inserted stretching rod as well as a venting system.

FIG. 2 shows a longitudinal section through a preform 2 into which a stretching bar or a stretching rod 17 is inserted. The stretching rod 17 serves for at least temporary guiding of the preform 1 during its transformation to the container 11. Typically, there is a contact between a point 18 of the stretching rod 17 and a bottom 19 of the preform 2. The preform 2 is stretched longitudinally when the stretching rod 17 penetrates further into the preform 2. Upon completion of the stretching cycle or at least temporarily during the performance of the stretching cycle, the filling material 21 extracted from a supply device 20 is conveyed into the preform 2.

The filling material 21 is metered by using a multi-way metering valve 22. In the exemplary embodiment represented, the stretching rod 17 is at least in certain areas hollow or has a duct and the filling material 21 is conveyed to a cavity 23 of the stretching rod 17. The region of a wall of the stretching rod 17 includes outlet openings 24 which can be shut off by a return valve 25 with respect to the multi-way metering valve 22. This enables to avoid or to minimize unintentional dripping of the filling material 21 from the stretching rod 17.

The preform 2 can be vented by using a venting valve 26. The venting valve 26 is connected to an outlet opening 27 which is arranged in the region of a connecting element 28 acting upon the preform 1. The stretching rod 17 can be positioned through the connecting element 28. The preform 2 is sealed by a gasket 29 with respect to the connecting element 28, which can be in the form of an O-ring for instance. A cavity 30 of the preform 2 can be connected to the outlet opening 27 via an annular slit 31. To do so, the annular slit 31 surrounds the stretching rod 17.

Figure 3:
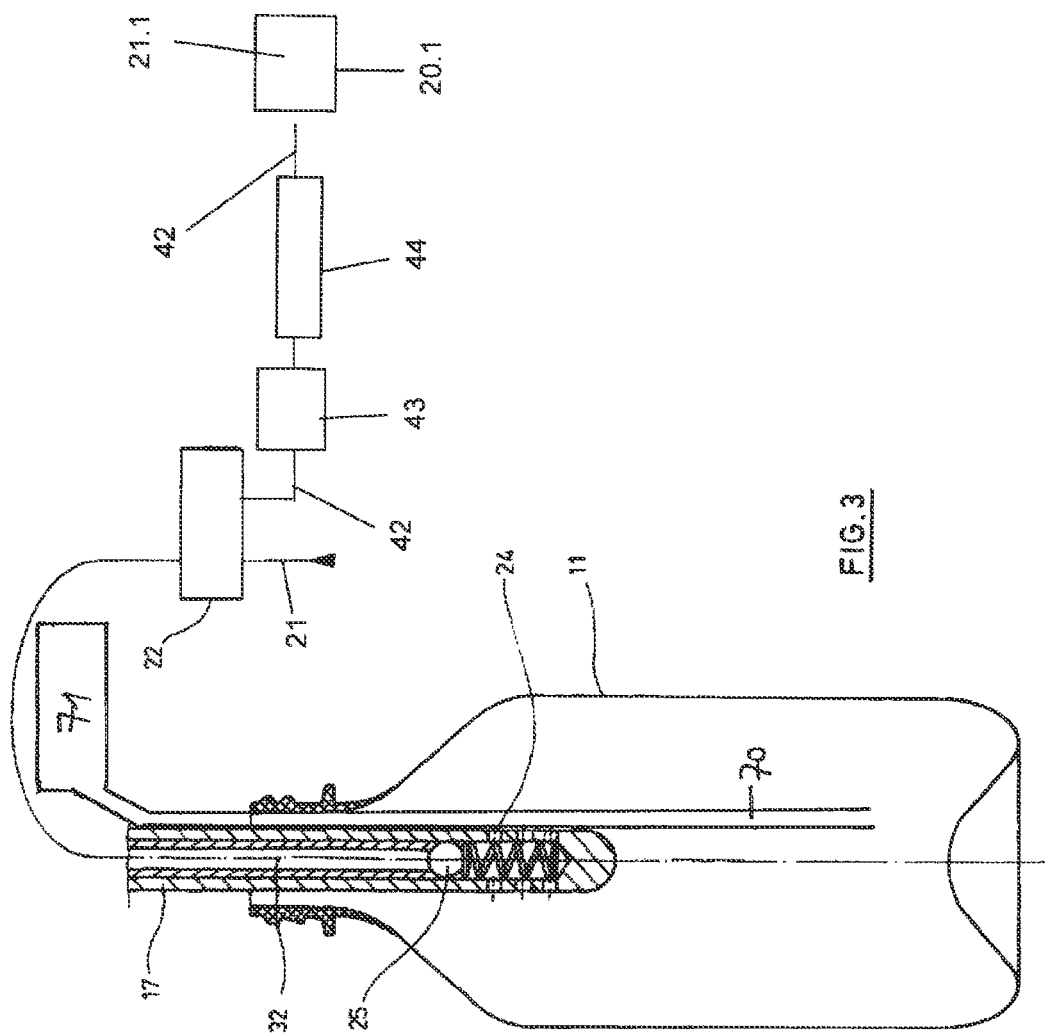
FIG. 3 shows a diagrammatical longitudinal section through a formed container with a partially inserted stretching and filling device.

FIG. 3 shows diagrammatically a similar device as in the illustration according to FIG. 2 by using a hollow stretching rod 17 with a built-in return valve 25. An already fully formed container 11 is however represented. FIG. 2 as well as FIG. 3 clearly show that preferably a plurality of outflow openings 24 is arranged in the region of the stretching rod 17. With the exemplary embodiment represented, such outlet openings 24 are positioned at different height levels along a longitudinal axis 32 of the stretching rod 17. Likewise, the exemplary embodiment represented shows an orientation of the outlet openings 24 with a substantially horizontal outlet direction. The arrangement of the outflow openings 24 in the region of the stretching rod 17 as well as the orientation of the outflow openings 24 can be varied. The aim is to provide typically the quietest and the most splash-free outflow behavior.

In accordance with the invention, there is furthermore diagrammatically shown a device for supplying dry ice 70, with which in the second process phase dry ice, in the present example in the form of pellets, can be shot from an insulated storage tank 71 into the developing or the already formed container. The foaming of the filling medium after relieving the container can thereby be delayed until the container is closed. At the same time, it is possible to fill a filling medium having a high $CO_2$ content in the containers.

Figure 4:
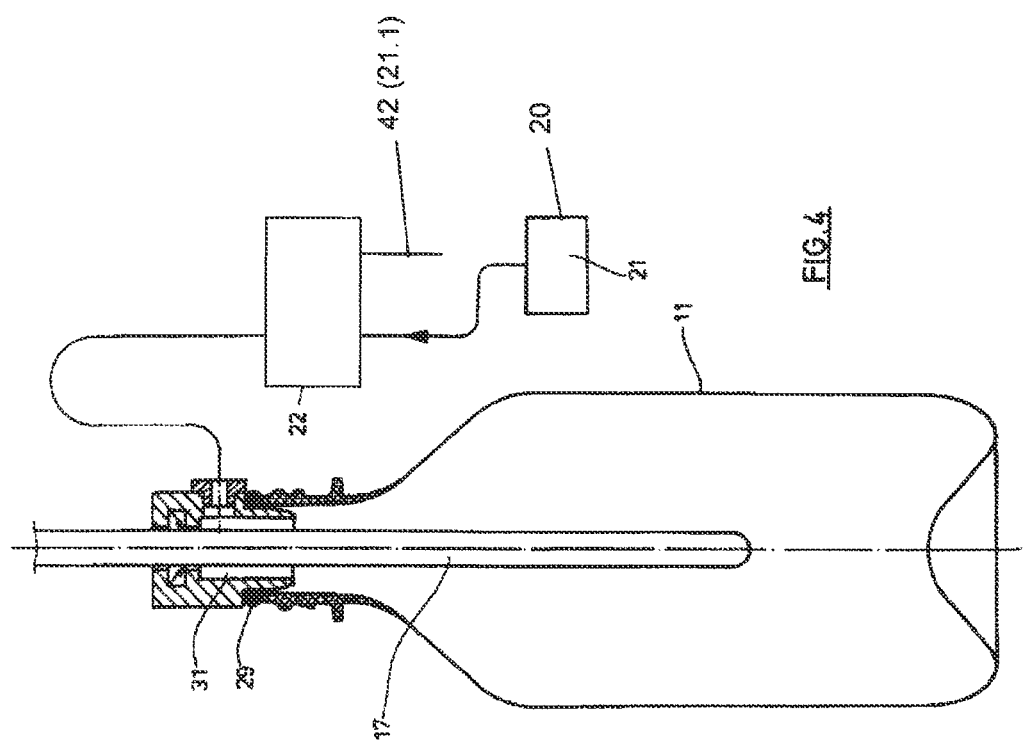
FIG. 4 shows a longitudinal section through a forming and filling device or station in a modified embodiment.

According to the embodiment of FIG. 4, a massive stretching rod 17 is used. The filling material 21 is supplied along at least a flow duct past the stretching rod 17. Preferably, the annular slit 31 is used to do so. Also with this embodiment, it is possible to perform a targeted ventilation.

Figure 5:
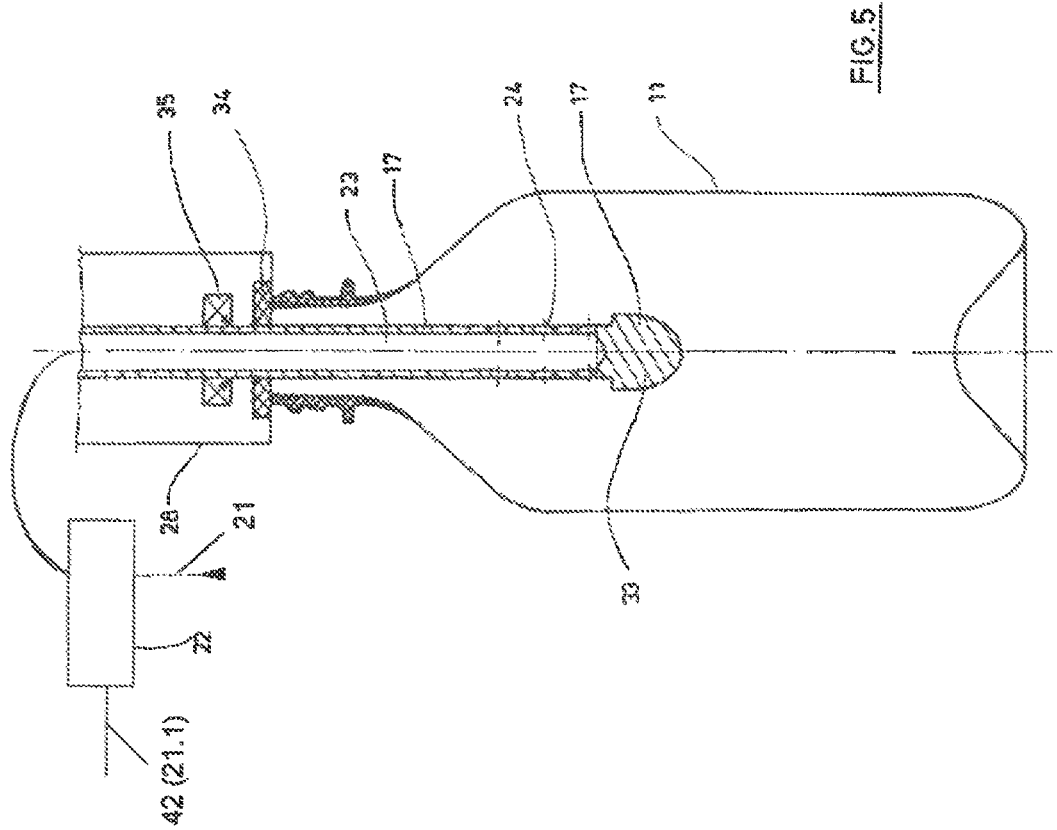
FIG. 5 shows a longitudinal section through a forming and filling device or station with a seal to prevent dripping.

FIG. 5 shows an embodiment with a stretching rod 17 possessing an optimised form to prevent any dripping. A sealing element 33 is therefore arranged in the region of the tip 17. The sealing element 33 can for example be provided by enlarging the diameter of the stretching rod 17. Likewise, an appropriate selection of materials can be envisaged. When retracting the stretching rod 17 from the container, the sealing element 33 enters into contact with a counter element 33 which is arranged in the region of the connecting element 28. The counter element 34 is preferably designed as a gasket. The outlet openings 24 of the stretching rod 17 are arranged separately and sealed from the container 11 after appropriate positioning of the stretching rod 17 so that dripping from the cavity 23 of the stretching rod 17 can be avoided reliably. Typically, at least one bearing 35 is arranged in the region of the connecting element 28 for guiding the stretching rod 17.

Figure 6:
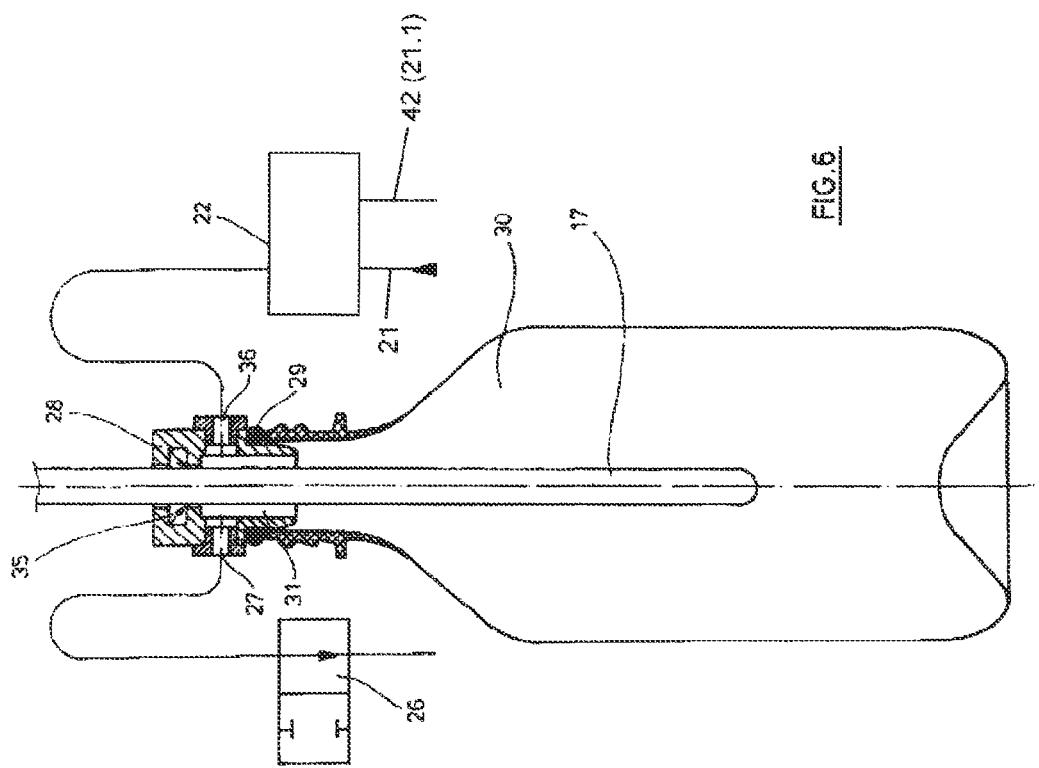
FIG. 6 shows an embodiment with controllable supply of the filling material and separately controllable venting.

FIG. 6 shows a form of embodiment in which again a massive stretching rod 17 is used. The multi-way metering valve 22 for the filling material 21 as well as the venting valve 26 are connected to the cavity 30 of the preform 2 or of the container 11 via flow ducts running past the stretching rod 17, in particular through the annular slit 31. In the exemplary embodiment represented, the outlet opening 27 is arranged in a radial direction of the connecting element 28 opposite to a supply opening 36 which is connected to the multi-way metering valve 22.

Figure 7:
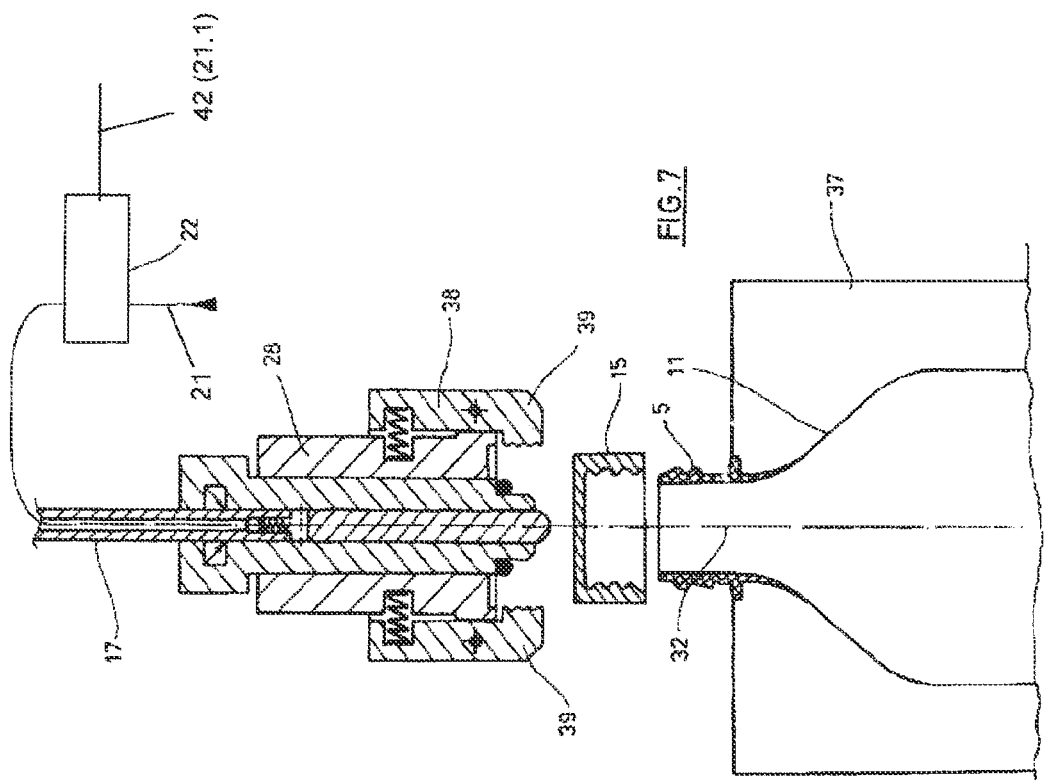
FIG. 7 shows a diagrammatical illustration of a combined forming, filling and closing device or station.

FIG. 7 shows an embodiment in which the containers 11 are also closed hermetically in the region of the process wheel 9 according to FIG. 1. The container 11 is still arranged in the region of a mould 37 which forms a portion of the forming station 10 according to FIG. 1. A closing device 38 is arranged coaxially to the connecting element 28 with respect to the longitudinal axis 32 in this embodiment. The closing device 38 includes for example grippers 39 mounted pivotably which are provided for acting upon the closing element 15. The idea behind that in particular is to arrange the closing device 38 rotatably with respect to the connecting element 28. Thereby, the closing member 15 can be screwed with an internal thread on an external thread of the mouth section 5.

Figure 8:
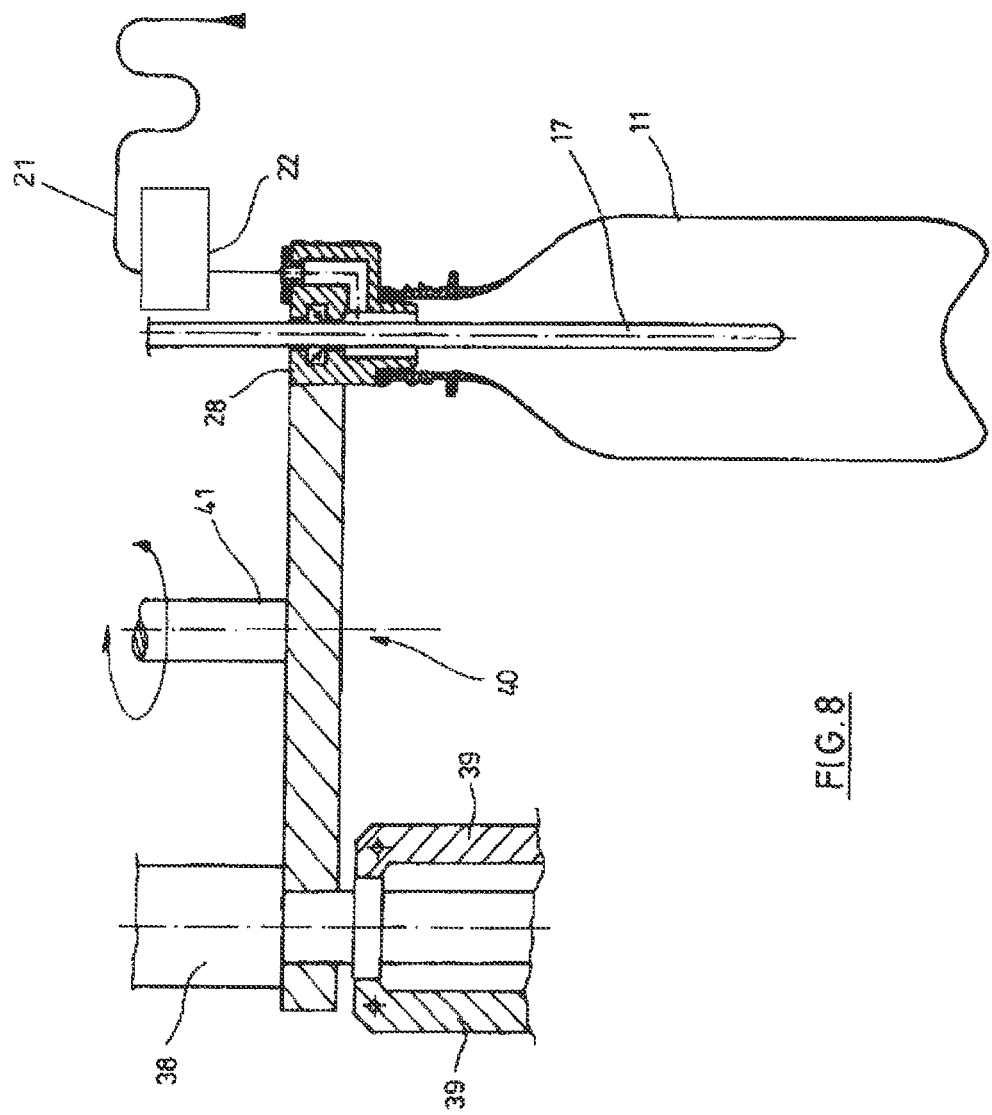
FIG. 8 shows another embodiment of the combined forming, filling and closing device or station according to FIG. 7.

FIG. 8 shows an alternative form of embodiment for the construction according to FIG. 7. The closing device 38 and the connecting element 28 are here not arranged coaxially relative to one another but are positioned by a tool carrier 40 alternately in a working arrangement or in a resting arrangement. The tool carrier 40 can be designed for example in a revolver-type arrangement and be fitted with a rotational axis 41.

Certain process-typical parameters are for example described more in detail below. The filling material 21 is supplied to the connecting element 28 preferably with a temperature of the surrounding room, for example in the range of 20° C. to 30° C. The filling material 21 thereby cools the material of the container 11 and supports a rapid form stability of the formed container 11. This provides a very short cycle time. Likewise, it is also possible to supply the filling material 21 once it has been cooled or heated up more strongly.

During the forming of the container 11, the filling material 21 can be introduced at least temporarily with a constant volume flow rate into the preform 2 or into the container 11.

But it is also possible to provide for the volume flow rate an appropriate temporal profile in such a way that different volume flow rates are generated at different points in time.

Before introducing the filling material 21 it is possible to suck away the air situated inside the preform 1 and/or to replace it with an inert gas. This is particularly recommended with oxidation-sensitive filling media 21.

As filling material 21, either pure liquids or liquids provided with additives, can be used. The supply of carbonized filling media is considered in particular. Since the filling material 21 is supplied to the preform 1 or to the container 2 under pressure, for instance with a pressure of 10 bars, it appears appropriate to design all the flow paths for the filling material 21 in such a way that local decompressions are prevented by the flow processes. Otherwise, a local or temporary decompression could lead to outgassing of the carbon dioxide.

Alternatively to the heating represented in FIG. 1 of preferably injection-moulded preforms 2, it is also possible to produce the preforms 2 immediately before their transformation into the containers 11. This can be realized for example using an injection-molding process as in a so-called single-stage injection blow method; a compression forming process is likewise possible. Such a forming of the preforms 2 avoids using electrical and electronic components in the region of a heating device or at least reduces substantially the extent of use of such parts since the latter are only required for possibly necessary temperature profiling.

Corrosion-resistant substances are preferably used as materials for the components of the process wheel 9, in particular stainless steels as well as plastics. In particular, the moulds 37 can be made totally or partially out of an appropriate plastic.

In order to minimize the necessary stretching forces, it is possible to support the stretching cycle by the supply of the filling material 21. When supporting the stretching cycle in this way, it must however be assured that the preform 2 is guided by the stretching rod 17. The operation may for instance consist in measuring the acting stretching force and in controlling the volume flow rate of the filing material 21 in such a way that a minimum stretching force is always maintained. The magnitude of the stretching force can be determined in particular quite easily with electrically driven stretching systems by measuring the drive current or with pneumatic stretching systems by measuring the pressure.

When filling containers 11 with the filling material 21 it is often desirable to provide a gas-filled headroom after closing the container hermetically 11. Said free headroom can be generated by the volume reduction which results from the retraction of the stretching rod 17.

The selection of materials already mentioned above takes given hygiene requirements into account. Degermination or sterilization can thus be guaranteed. The construction design shall be carried out in such a way that the requirements in good cleanability are fulfilled.

One or several of the transfer wheels can be fitted with servo drives.

This supports in particular a complete separation of the heating device 4 from the process wheel 9 during cleaning cycles. Likewise, in the region of at least one of the transfer wheels, retractable manipulation elements may be arranged. The use of a dry air tunnel can provide a further protection against moisture.

By way of example, a concrete process flow is described below. Before or after inserting the preform 2 into the mould 37, there is first of all a gas exchange in the cavity of the preform, in order to repel oxygen in particular or to reduce the portion of oxygen. The flushing and/or exhaust cycle lasts typically at most 0.1 second. The stretching of the preform 2 by using the stretching rod 17 lasts typically approx. 0.2 second. Likewise, a time span of approx. 0.2 second is provided for the filling and the resulting transformation of the preform 2 into the container 11. A maximum time span of 0.2 second is typically required for the subsequent creation of a headroom. The container filled with still beverages can be calmed down and relieved from tension extremely fast, whereas with carbonated beverages, this cycle can take a time span of up to 5 seconds.

The headroom can be treated subsequently for example by using a high-pressure foaming or by feeding oxygen. The subsequent supply of a closing cap can take a time span of up to 1.5 seconds with carbonated beverages. Likewise, the closing or screwing cycle takes for instance a time span of 1.5 seconds.

Once the container 11 has been closed hermetically, the mould 37 opens and the filled container 11 is removed and transported away.

When inserting the filling material into the preform 2 to be transformed or into the container 11 still in the forming process there is usually a typical pressure gradient in the filling system or in the preform 2 or more precisely the container 11 still in the forming process. Due to the expansion of the container 11, there is first of all a relatively low pressure which increases till the end of the forming cycle. The corresponding pressure rise or the height of the pressure rise in the filling system, in particular in the filling conduit, can be used as a control parameter for a following process step and if applicable determine the moment of introduction of said next process step. Alternately or in addition thereto, the characteristic of the pressure gradient and/or of the volume flow rate of the filling material can be used as control parameters.

As regards the temperature of the filling material, the filling material may be conveyed with a surrounding temperature. Depending on the respective conditions of application, instead of filling at surrounding temperature, a temperature increase or a temperature decrease can be contemplated.

According to a further variation, the filling process may be implemented in two stages, whereas during the first process step the filling material is conveyed at a temperature which is higher than the temperature during the second process step. The first process step can be for example be carried out when the longitudinal stretching of the preform 2 is performed over the stretching rod 11. The second process step follows the performance of the stretching cycle and corresponds to the transversal expansion of the container 11.

During the aforementioned appeasement in the headroom after pressure relief, it may also be carried out an aspiration of developing gases and/or foam, if applicable.

As regards the closing of the finished formed and filled containers 11, different variations can also be realized. In a variation, it is possible to fit a portion of the manipulation or forming and filling stations 10 on the rotor or process wheel 9 with a revolver head. The revolver head includes on the one hand a blowing or forming and filling head and on the other hand a closing head. This corresponds to the diagrammatical representation of FIG. 8. Likewise, it is also contemplated to use an integrated construction with which the respective head carries out the blowing, the filling and the closing cycle.

According to a further variation, the forming and filling head as well as the closing head are designed as separate components, but arranged to pivot at every forming and filing station 10. According to a third variation, only the forming and filling head is provided on the rotor or process wheel 9 and the container still open is transferred to a separate closing system, for example to a transport wheel, which is fitted with a closing head.

The application of the closing elements 15, for instance of the closing caps, can take place immediately after opening the respective mould 37 and the gripping of the container 11 via a holding and gripping element. An advantageous variation consists in maintaining the mould 37 closed and hence to fix the container 11 in correct position, whereas only the mouth is released for a closing element. Said release takes place in moving the mould 37 either for an angular distance on a radially different position or in pivoting and/or moving the forming and filling head so that the container mouth is free for a closing element.

To do so, the closing caps would be placed on the rotor or the process wheel 9. In particular, an inert gas may be applied to the mouth space of the filled container 11 before positioning the closing elements 15.

In the above description it was considered for simplifying purposes that only one supply device 20 is provided for the filling material 21. In fact, the forming and filling system or machine includes a further supply device 20.1 for an additional portion or a further component of the filling material, which exhibit a higher $CO_2$ content than the filling material 21 and is designated below with 21.1.

It has proved particularly advantageous to achieve stratification with the aforementioned methods and in particular with respect to the introduction of the portion or of the component of the filling material 21.1 with a $CO_2$ content or with the higher $CO_2$ content. It has namely appeared problematic in the case of a full or partial carbonization of the filling material, to obtain the rapid pressure relief after removal from the mould and filling of the containers 11, from the high forming and filling pressure up to the closing of the respective container for instance at ambient pressure without product loss. A massive foaming occurring here with product loss has prevented the use of this hydraulic transformation technique for $CO_2$ containing products so far.

According to a cognition underlying the invention, it is particularly advantageous to avoid such product losses if the filling material 21 or 21.1 or the portions of the filling material 21 or 21.1 are supplied at least at two points in time or in at least two process phases with different carbon dioxide contents and/or with different temperatures. To do so, it is appropriate in a second or subsequent process phase, to feed the filling material or the filling material component 21.1 with the higher concentration of carbon dioxide. This has the advantage that the filling material 21 and 21.1 in the generated container 11 commonly constitute the hydraulic pressure medium to form the container 11, but the filling material 21 already introduced in the developing container 11 has calmed down and when introducing the filling material 21.1 or the portion of filling material 21.1 with the higher $CO_2$ concentration, first of all further solution processes take place in the liquid volume. The second or subsequent process phase is thereby for instance a process phase completing the forming and filling phase. The introduction of the filling material 21.1 or of the portion of filling material 21.1 with the higher $CO_2$ concentration is preferably stratified into the already present liquid volume, i.e. for instance in the region of the bottom of the developing container 11. The introduction of the filling material components or of the filling material 21 and 21.1 takes place in a controlled manner through the multi-way metering valve 22.

There is a variation which consists in cooling the filling material 21.1 or the portion of filling material 21.1 with the higher concentration of carbon dioxide before introduction, and in that in the aforementioned second process phase introducing said filling material 21.1 or the corresponding portion with the higher concentration of carbon dioxide with a lower temperature than the filling material 21 or the portion of filling material 21 of the first process phase into the developing container 11. The result is a lower layer with a filling material rich in $CO_2$, whereas a foaming, also a foaming during the relieving process is decreased to the extent that disadvantageous product losses do not occur.

Therefore, the carbon dioxide content in the second process phase should be 30% in weight above the carbon dioxide content during the first process phase, in particular 50% in weight to 100% in weight above the carbon dioxide content in the first phase. Ideally, during the first or initial process phase, a quiet, i.e. a filling material component free from $CO_2$, such as the filling material 21 and during the second process phase a filling material component rich in $CO_2$, i.e. the filling material 21.1, are introduced into the developing container 11.

There is an alternative in which the temperature of the filling material 21.1 or of the portion of filling material 21 of the second process phase is cooled, in which it is at least 10° C. below the temperature of the first or a previous process phase, and in particular is lower than 10° C. and ideally ranges between 4° C. and 8° C.

It has appeared advantageous that the pressure of the filling material 21.1 or of the portion of filling material 21.1, which exhibits the higher carbon dioxide concentration and/or the lower temperature, at least during the transformation process or during the forming and filling phase is partially higher than the pressure of at least another portion or of the residual portion of the filing material 21, and preferably by at least 1 bar.

Moreover, the pressure on a conduit section 42 or a portion of the conduit section, via which the filling material 21.1 or the portion of the filling material 21.1 with the higher carbon dioxide concentration and/or the lower temperature is conveyed, is higher than the pressure of the residual filling material 21 or of the residual portion of the filling material 21, and during the shaping process at least temporarily higher by 2 bars to 5 bars.

An embodiment provides that a throttle element or a narrowing cross-section is provided in the flow path of the filling material 21 and 21.1 flowing inside the stretching bar 17, whereas the throttle element is arranged in the flow direction of the filling material 21 and 21.1 for instance shortly before at least one output 24 of the stretching rod 17. Consequently, the advantageous high pressure is maintained up to shortly before the first relaxation. This pressure can be raised further when a portion of the filling material 11 is guided past the horizontal rod 17 and a portion of the filling material 11 is guided through the horizontal rod. To do so, the stronger carbon dioxide-containing filling material 21.1 should be conveyed more appropriately through the stretching rod 17. It is also advantageous if the stretching rod 17 is thermally insulated at in a section with respect to the filling material 21 and 21.1.

The forming and filling system or machine thereby encompasses for producing filled containers 11 made of a thermoplastic material among others the at least one heating section or heating system 4 arranged along a transport path of a preform 2 and at least one forming and filling station 10 fitted with a mould.

Moreover, the forming and filling system or machine encompasses among other things a feeding device 1 for the filling material 21 and 21.1 to be filled into the container 11 as well a carbonization unit 43, which for example is provided in the conduit section 42 and with which carbon dioxide can be dissolved at least in the partial flow of the filling material 21.1, whereas the forming and filling station 10 has a guiding device in the form of a stretching rod 17 acting at least temporarily upon the preform 2 during its transformation into the container 11 and at least one portion of the filling material 21 can be conveyed through the duct or the cavity 23 of the stretching rod 17. At least one outlet opening 24 of the conduit or cavity 23 is provided at the lower end of the stretching rod 17.

Advantageously, a cooling unit 44 is provided at least along the conduit section 42 for the filling material 21.1, in which downstream carbon dioxide is dissolved or which flows from the carbonation unit 43.

At least the conduit section 42, in which the filling material 21.1 rich in carbon dioxide or a portion thereof is guided, at least thermally insulated on a partial length, for example with a Teflon insulation or made of a Teflon-containing material, and/or is cladded with a thermal insulation, for instance with Teflon or a Teflon-containing material.

Figure 11:
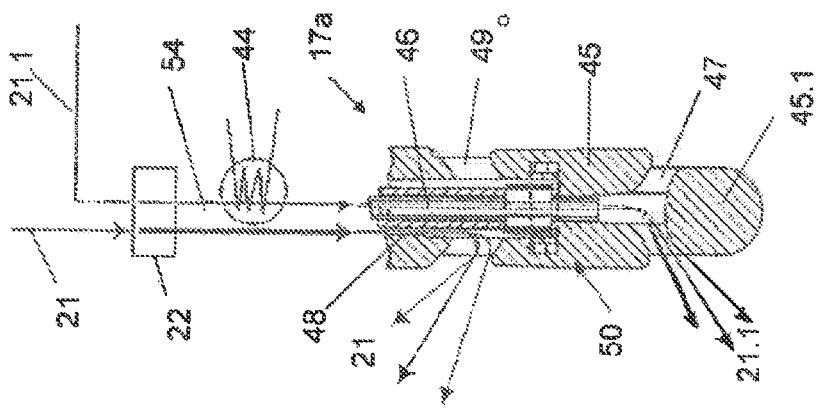
FIGS. 9-11 show a diagrammatical sectional view of a further embodiment of the stretching rod of a forming and filling machine or station according to the invention in different process phases.
Figure 10:
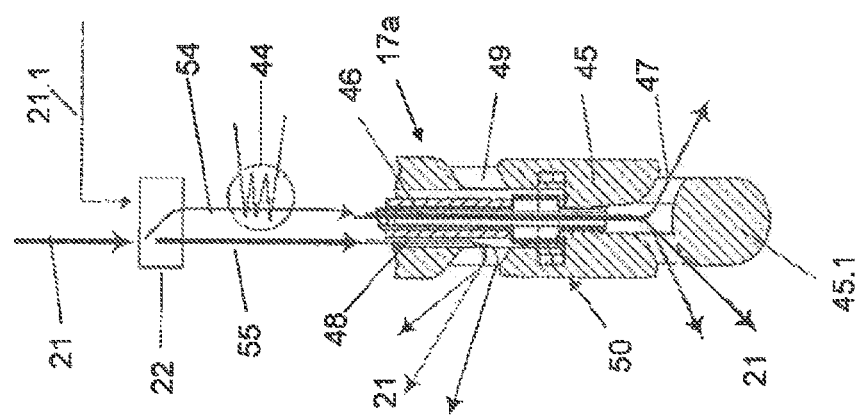
Figure 9:
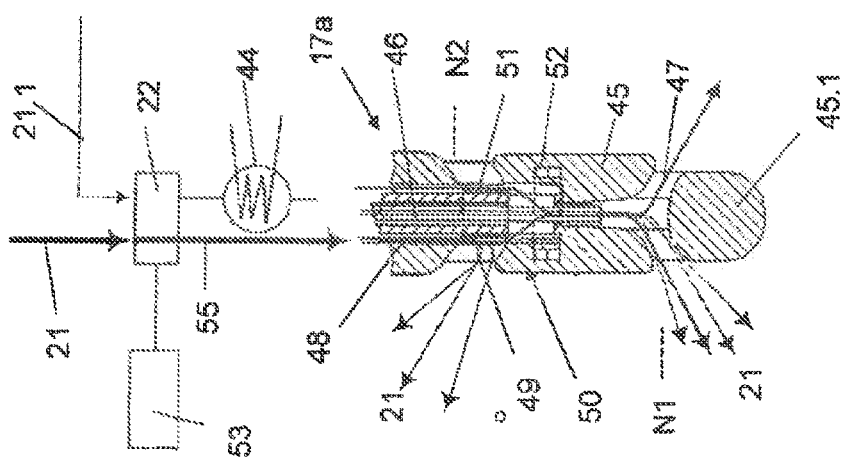

FIGS. 9-11 show in a partial and sectional representation a stretching rod 17a, which corresponds to the stretching rod 17 in its basic function, i.e. serves during the forming and the filling of the respective preform 11 for guiding and for controlling in particular the axial stretching of the respective preform 2 or of the developing container 11. The stretching rod 17a mainly consists of a bar-shaped stretching rod body 45 with a rounded free stretching rod end 45.1. Several ducts are arranged in the stretching rod body 45, namely an internal duct 46 arranged coaxially with the longitudinal axis of the stretching rod 17a, which emerges in the vicinity of the end 45.1 at several outlet openings 47 distributed around the axis of the stretching rod 17a on the lower level N1, as well as an external annular duct 48 surrounding the internal duct 46 and separate from said internal duct, which external duct emerges at several upper outlet openings 49 distributed around the axis of the stretching rod 17a, at the surrounding or envelope surface of the stretching rod 17a on the upper level N2. A control valve designated with 50 in FIG. 9 is moreover provided in the inside of the stretching rod 17a, a valve with which a connection can be established or interrupted between the internal duct 46 and the external duct 48 in a controlled manner. The control valve 50 is formed substantially of an axially movable lock ring 51 in the represented embodiment, which is preloaded for example by a spring, not represented in detail, in its raised position in FIG. 9 and its position releasing the connection between the ducts 46 and 48. The lock ring 51 is mobile against the effect of the spring in its position interrupting the connection between the ducts 46 and 48 by an actuating device, for instance through a magnet coil 52 housed in the stretching rod 17a.

FIGS. 9-11 represent moreover the multi-way metering valve 22 controlled by the electronic control unit 53, a valve which is again designed as a multiway valve, which is connected to a first connection or inlet with the supply device 20 not represented in FIG. 9 for the filling material 21 and which is associated with a second connection with the supply device 20.1 not represented in FIG. 9 for the filling material 21.1. The outlets of the multi-way metering valve 22 are associated via a liquid connection 54 with the internal duct 46 or via a liquid connection 55 with the external annular duct 48. The cooling unit 44 is arranged in the liquid connection 54. The control valve 50 or its magnet coil 52 is controlled by the control unit 53, whereas the control valve 50 is realized in the represented variation as an electromagnetically, linearly driven system. This has the particular advantage to be able to adjust the closing and opening speeds continuously. It is therefore not necessary to design the control valve 50 to 100% in a tight manner, a small amount of leak can be tolerated.

Different operating modes are possible with the stretching rod 17a, namely for example the simultaneous introduction of the filling material, for example of the filling material 21 without $CO_2$ content or with reduced $CO_2$ content on the lower level N1 via the outlet openings 47 and on the higher level N2 via the outlet openings 49 into the preform 2 or into the developing container 11. Therefore, the control valve 50 is opened by suitable control from the control unit 53 for a connection of both ducts 46 and 48 and moreover the multi-way metering valve 22 is controlled through the control unit 53 in such a way that this metering valve only provides a connection with the liquid connection 55. Said operating condition is represented in FIG. 9.

With a closed control valve 50, it is moreover possible to establish a connection to both ducts 46 and 48 by a suitable control of the multi-way metering valve 22 via said valve for the filling material 21 so that the filling material 21 is again inserted according to the arrows via the outlet openings 47 and 49 at the different levels of height N1 and N2 into the preform 2 or into the developing container 11. In the operating condition represented in FIG. 10, there is still the possibility to cool the partial quantity of the filling material 21 in the cooling unit 44, a quantity fed to the internal duct 46 and exiting the lower outlet openings 47, or to cool the liquid connection 54 for a chronologically following process step with the filling material.

Moreover, there is the possibility, by suitable control of the multi-way metering valve 22, to supply the filling material 21.1 via the liquid connection 54 in the internal duct 46 for the exit exclusively at the lower outlet openings 47 or on the high level N1 and to supply the filling material 21 for the exit exclusively at the upper outlet openings 49 or on the higher level N2, whereas the supply of the filling material 21 and 21.1 is either simultaneous, time-delayed or with a time overlap, and namely with an evacuation which is time-delayed or with a time overlap preferably in such a form that first of all the filling material 21 is supplied via the upper outlet openings 47 and then the filling material 21.1 is supplied via the lower outlet openings 49. Said operating condition, in which again the filling material 21.1 is cooled in the cooling unit 44, is represented in FIG. 11. It goes without saying that the various operation conditions represented in FIGS. 9-11 can be combined at will in the respective forming and filling phase.

It is for example possible during the respective forming and filling phase in a first partial or process phase according to FIG. 9 to introduce the filling material 21 via the outlet openings 47 and 49 in a chronologically following second partial or process phase according to FIG. 10 to introduce the filling material 21 via the outlet openings 47 and 49 further and hence simultaneously to pre-cool the liquid connection 54 with the filling material 21 flowing through the cooling unit 44 and then according to FIG. 11 in a third partial or process phase to introduce the filling material 21.1 via the lower outlet openings 47, whereas for example the filling material 21 is further supplied via the upper outlet openings 49.

A calmed intermediate zone is formed in each of the cases between the height levels N1 and N2, a zone which delineates the portions of filling material from each other. An advantageous influence lies in the aforementioned electromagnetically driven control valve 50, because it enables a low-impulse and low-blending changeover. A further advantage consists with said electromagnetically driven control valve 50 that it is quite robust and can be cleaned very easily in corresponding cleaning cycles using quick, and, if necessary, multiple switching.

Figure 12:
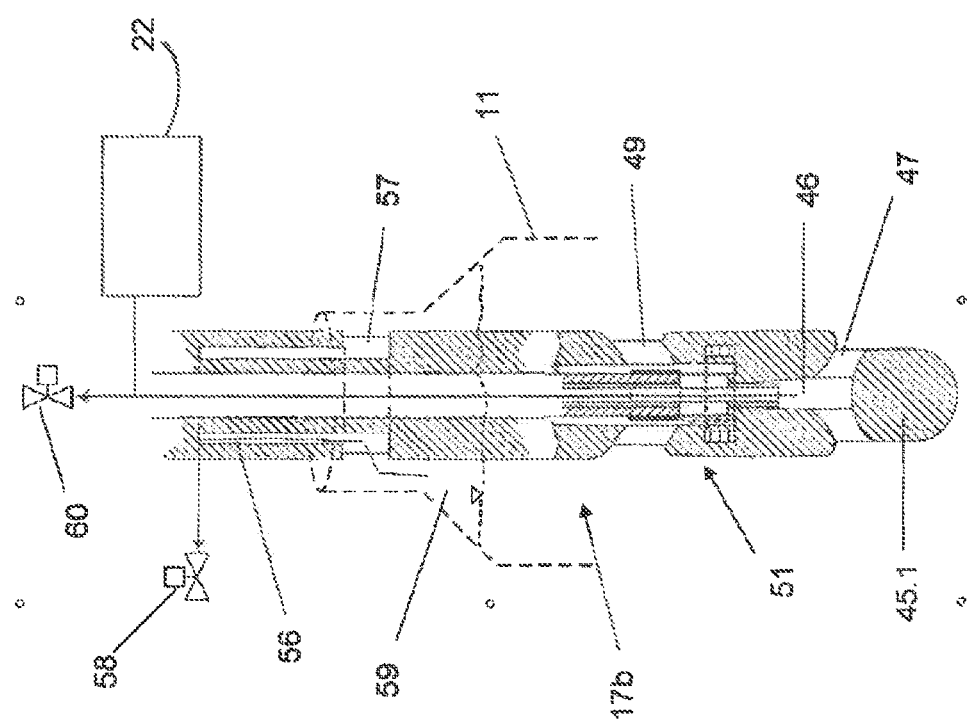
FIG. 12 shows in a similar representation to FIGS. 10-12 a further modified embodiment of the stretching rod of the forming and filling machine or station according to the invention.

FIG. 12 shows a simplified sectional view of a further embodiment of a stretching rod 17b, which differentiates from the stretching rod 17a substantially only in that in addition to both ducts 46 and 48 a third annular duct 56 is provided in an upper region, remote from the stretching rod end 45.1, a duct which emerges at several outlet or relief openings 57 distributed around the axis of the stretching rod 17b at the surrounding or envelope surface of the stretching rod 17b. The headroom 59 formed in the container 11 above the surface of the filling material is relieved via the duct 56 for example by a control valve 58 driven by the control unit 53 after forming and filling the respective container 11. The container 11 can be further relieved after forming and filling via the outlet openings 47 and when the control valve 50 is open, also via the outlet openings 49, for example by a control valve 60 driven by the control unit 53.

The stretching rods 17a or 17b represented in FIGS. 10-13 or the forming and filling devices or machines having said stretching rods also enable to evacuate the respective preform 2 before starting the forming and filling phase and/or to rinse it for example with a hot inert gas, and preferably via the lower outlet openings 47.

As shown in FIGS. 9-12, the outlet openings 47 and 49 or the stretching rod 17a are designed at their surrounding or envelope surface in such a way that the main flow direction of the medium exiting the outlet openings 47 or 49 with respect to the longitudinal axis of the stretching rod 17a is tilted in an angle smaller than 90°, namely at the lower outlet openings 47 in such a way that said angle opens at the lower stretching rod end 45.1 and at the upper outlet openings 49, that said angle opens towards the end of the stretching rod 17a facing away from the lower stretching rod end 45.1.

The outlet openings 47 or 49 have in particular rounded edges or radii so that local turbulences and cavitation are avoided and result in a stable stratification. More advantageously, the rounded edges of the outlet openings 47 and 49 are provided at the stretching rod radially and inwardly as well as radially and outwardly.

LIST OF REFERENCE SIGNS

1 Feeding device
2 Preform

3 Transfer wheel
4 Heating device
5 Mouth section
6 Heating element
7 Transport device
8 Transfer wheel
9 Process wheel
10 Forming and filling station
11 Container
12 Extraction wheel
13 Output distance
14 Input device
15 Closing member
16 Mould partitioning
17 Stretching bar or stretching rod
17.1 Narrowing portion
18 Tip of the stretching rod
19 Bottom of the preform
20 Supply device
21 Filling material
22 Multi-way metering valve
23 Cavity of the stretching rod
24 Outlet opening
25 Return valve
26 Venting valve
27 Outlet opening
28 Connecting element
29 Seal
30 Cavity of the preform
31 Annular slit
32 Longitudinal axis of the bottle or
33 Sealing element
34 Counter element
35 Bearing
36 Supply opening
37 Mould
38 Closing device
39 Gripper
40 Tool carrier
41 Rotational axis
42 Conduit or conduit section
43 Carbonation unit
44 Cooling unit
45 Stretching rod body
45.1 Stretching rod end
46 Duct
47 Outlet opening
48 Duct
49 Outlet opening
50 Control valve
51 Lock ring
52 Magnet coil
53 Control electronics
54,55 Liquid connections
56 Duct
57 Outlet opening
58 Control valve
59 Headroom
60 Control valve
70 Feeding device for dry ice pellets
71 Storage tank for dry ice pellets

The invention claimed is:

1. A method for producing containers filled with a liquid filling material from preforms made of a thermoplastic material, the method comprising the steps of: thermally conditioning a respective preform and subsequently transforming the preform during a forming and filling phase in a mold with at least one liquid filling material as pressure medium so as to simultaneously form and fill the container; supplying the filling material or portions of the filling material in at least two process phases with different carbon dioxide contents; and in a second of the process phases providing the liquid filling material with a desired carbon dioxide concentration by introducing dry ice formed as pellets while the container is being formed.

2. The method of claim 1, wherein degassed filling material is conveyed in a first of the process phases.

3. The method of claim 1, wherein in the second process phase chronologically following a first of the process phases the filling material or the portion of filling material with a higher concentration of carbon dioxide is supplied.

4. The method of claim 1, wherein the preform is guided during transformation into the container at least temporarily via a stretching rod and is stretched in axial direction.

5. The method of claim 4, wherein the dry ice is inserted into the filling material or shot into the filling material.

6. The method of claim 4, wherein the filling material or the portion of filling material with the higher concentration of carbon dioxide is cooled before introduction, and/or in the second process phase the filling material or the portion of filling material with the higher concentration of carbon dioxide has a lower temperature than the filling material or the portion of filling material of the first process phase.

7. The method of claim 1, wherein the carbon dioxide content of the filling material or of the portion of filling material in the second process phase is at least 30% in weight greater than the carbon dioxide content of the filling material or of the portion of filling material of the first process phase.

8. The method of claim 7, wherein the carbon dioxide content of the filling material or of the portion of the filling material in the second process phase is 50 to 100% in weight greater than the carbon dioxide content of the filling material or of the portion of filling material of the first process phase.

9. The method of claim 1, wherein the temperature of filling material or of the portion of filling material of the second process phase is lower than 10° C.

10. The method of claim 9, wherein the temperature is between 4° and 8° C.

11. The method of claim 6, wherein a pressure of the filling material or of the portion of filling material with the higher carbon dioxide concentration and/or the lower temperature, is at least temporarily higher than a pressure of at least one other portion or of a residual portion of filling material by at least 1 bar.

12. The method of claim 11, wherein a pressure on a section of a conducting path is higher than the pressure of the filling material or of the portion of the filling material which has the higher carbon dioxide concentration and/or the lower temperature, and during the forming and filling phase or during the shaping process is at least temporarily higher by 2 bars to 5 bars than a pressure of at least one other portion or a residual portion of the filling material.

13. The method of claim 11, including providing a throttle element or a narrowing cross-section in a flow path of the filling material or of the portion of the filling material flowing inside the stretching rod, whereas the throttle element is arranged before at least one filling material discharge.

14. The method of claim 4, including guiding a portion of the filling material past the stretching rod and guiding a portion of the filling material through the stretching rod.

15. The method of claim 4, including cooling the filling material with a higher concentration of carbon dioxide-containing or the portion of said filling material, and/or guiding at least the filling material with the higher concentration of carbon dioxide or the portion of said filling material through the stretching rod.

16. The method of claim 4, wherein the stretching rod is thermally insulated at least in certain sections with respect to the filling material.

17. The method of claim 1, wherein the filling material or the portion of the filling material without carbon dioxide or with a reduced concentration of carbon dioxide is introduced into the preform into the container in formation in a first of the process phases through at least two filling material outlets at different height levels, and in the chronologically following second process phase of the forming and filling phase at least said filling material or the portion of filling material with a higher concentration of carbon dioxide is introduced into the preform or into the forming container at a lower height level, whereas the filling material or the portion of filling material Without carbon dioxide or with the reduced concentration of carbon dioxide is introduced in the second process phase or a greater height level above the lower height level.

18. The method of claim 17, wherein in a third process phase between the first and second process phase a liquid connection is pre-cooled by cooled filling material or a cooled portion of filling material without carbon dioxide or with the reduced concentration of carbon dioxide, the liquid connection through which in the second process phase the filling material or the portion of filling material with the higher concentration of carbon dioxide is guided for introduction into the preform or into the container in formation.

19. The method of claim 1, wherein the process phases are partial phases of the forming and filling phase.

* * * * *